United States Patent
Bjarnason

(10) Patent No.: US 12,513,194 B2
(45) Date of Patent: *Dec. 30, 2025

(54) SYSTEMS AND METHODS FOR SERVICE RESPONSE ANALYSIS VIA OUT-OF-BAND SIGNALING

(71) Applicant: NetScout Systems, Inc., Westford, MA (US)

(72) Inventor: Steinthor Bjarnason, Fjerdinby (NO)

(73) Assignee: NetScout Systems, Inc., Westford, MA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/466,661

(22) Filed: Sep. 13, 2023

(65) Prior Publication Data

US 2025/0088537 A1    Mar. 13, 2025

(51) Int. Cl.
*H04L 9/40* (2022.01)
*H04L 43/55* (2022.01)

(52) U.S. Cl.
CPC .............. *H04L 63/18* (2013.01); *H04L 43/55* (2022.05); *H04L 63/1491* (2013.01)

(58) Field of Classification Search
None
See application file for complete search history.

(56) References Cited

U.S. PATENT DOCUMENTS

| | | | |
|---|---|---|---|
| 7,930,750 B1* | 4/2011 | Gauvin | H04L 63/1416 709/227 |
| 2006/0168334 A1* | 7/2006 | Potti | H04L 67/02 709/227 |
| 2011/0184963 A1* | 7/2011 | Singh Thakur | H04L 67/565 707/755 |
| 2014/0150095 A1* | 5/2014 | Zhao | H04L 63/1458 726/22 |

* cited by examiner

*Primary Examiner* — Philip J Chea
*Assistant Examiner* — James Ross Hollister
(74) *Attorney, Agent, or Firm* — Foley & Lardner LLP

(57) ABSTRACT

Systems and methods for service response analysis via out-of-band signaling is provided. A system may obtain, via a first network channel, a network data packet from a network service provider. The system may determine the network data packet comprises a response code indicating a status of the request. The system may extract the response code from the network data packet. The system may generate an out-of-band response message comprising the response code. The system may send, to an external device via a second network channel, the out-of-band response message comprising the response code.

20 Claims, 10 Drawing Sheets

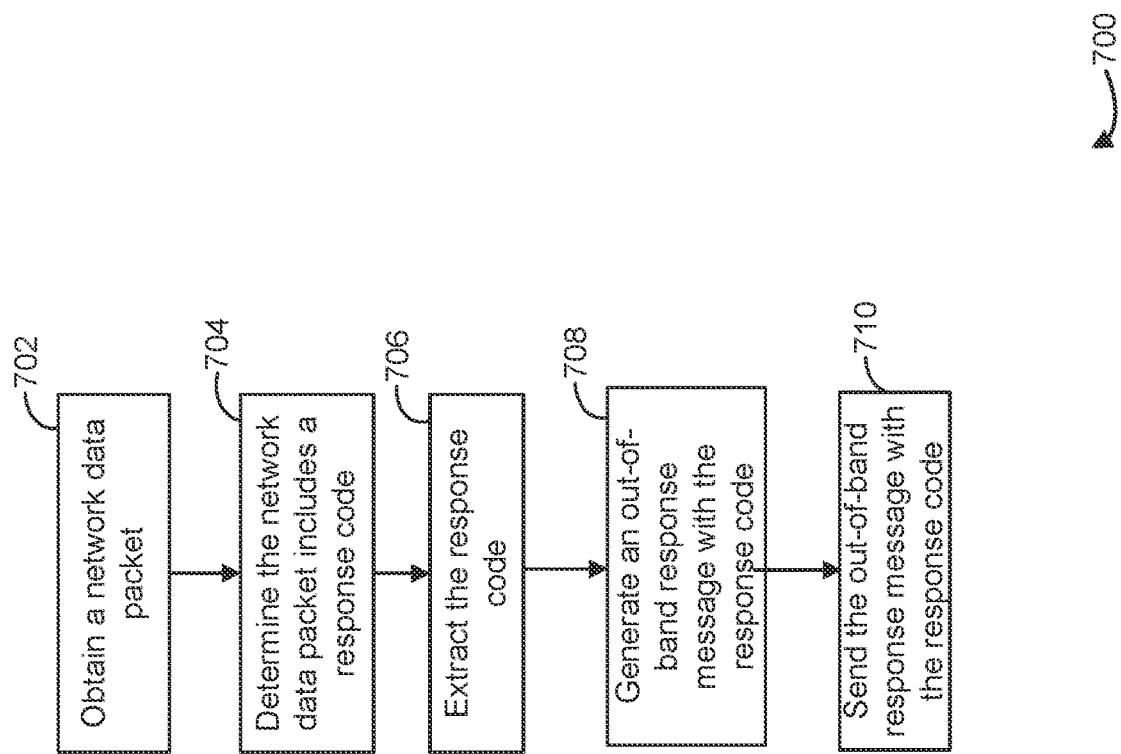

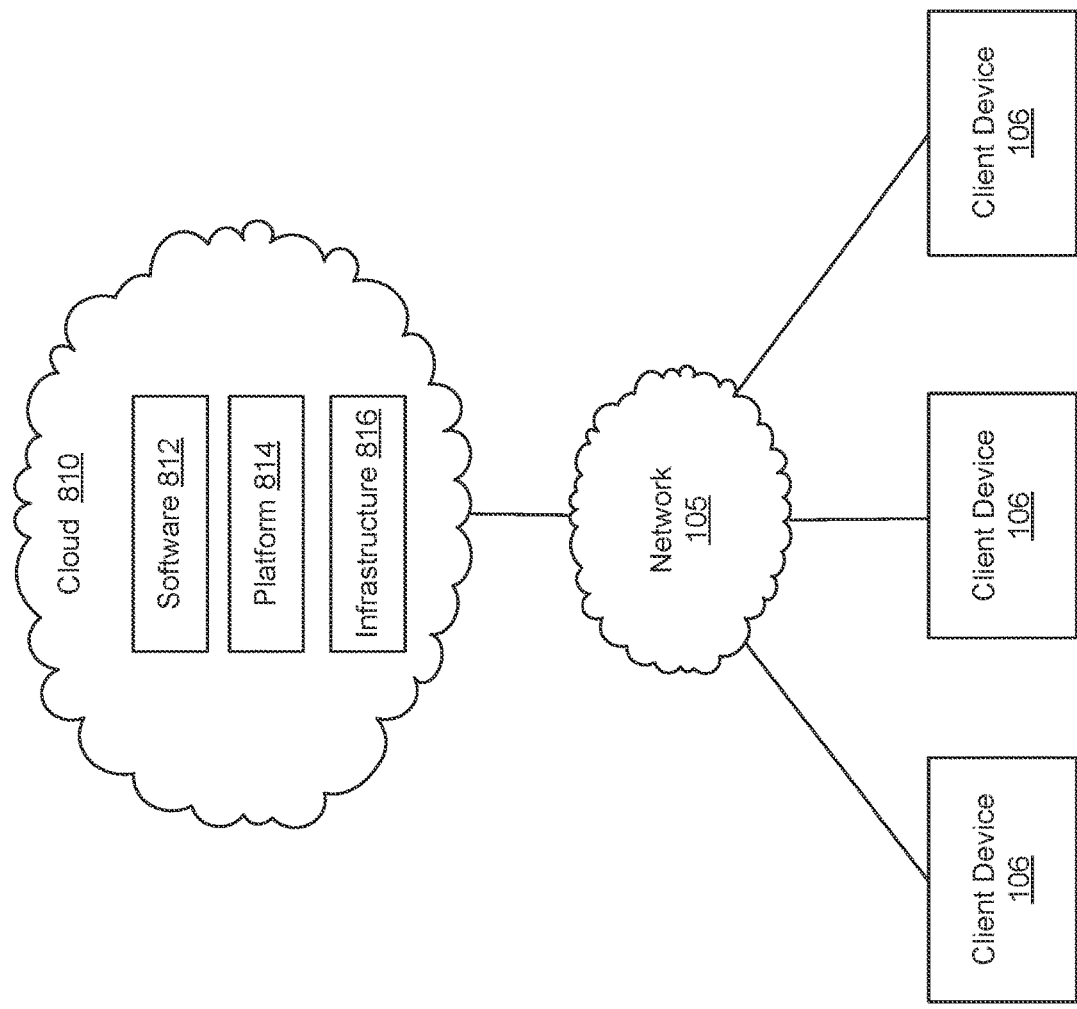

SYSTEMS AND METHODS FOR SERVICE RESPONSE ANALYSIS VIA OUT-OF-BAND SIGNALING

BACKGROUND

Distributed denial of service (DDoS) attacks are used by malicious actors to deny access to a given network service. A class of DDoS attacks focus on an application layer. These application layer attacks may involve attacking a specific application, such as web servers, session initiation protocol (SIP) voice services, and border gateway protocol (BGP), among others. The attacks may involve targeting specific configurations including protocol handshakes and protocol or application compliance. As a result, the attacks may be primarily launched using discrete intelligent clients, which may be difficult to detect.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 7 is a method for service response analysis, in accordance with an implementation;

FIG. 8B is a block diagram depicting a cloud computing environment including a client device in communication with cloud service providers.

DETAILED DESCRIPTION

Figure 1:
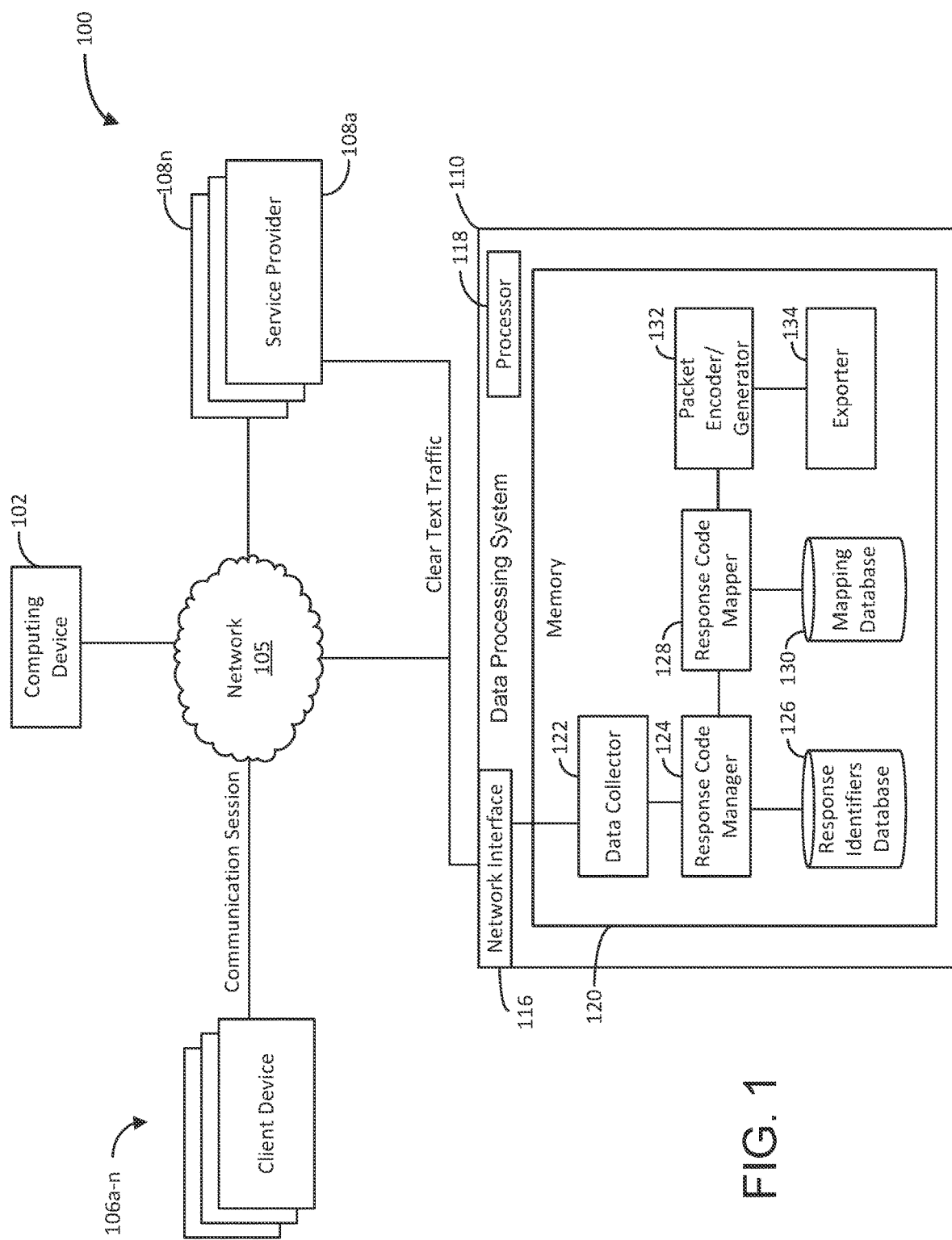
FIG. 1 is an illustration of a system for service response analysis, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Some systems may employ various techniques to detect network attacks. A monitoring system may use a service response analysis to detect attacks against network-based services and applications. The service response analysis uses the application to detect abusive clients by monitoring an outbound error response code. For example, if an attacker sends nonexistent domain name service (DNS) queries to a DNS service, the DNS service may respond with a first type of error response code (e.g., an NXDOMAIN error). Similarly, a wrong hypertext transfer protocol (HTTP) request may cause an application to send a second type of error response code (e.g., a 404 response). By monitoring the various types of error response codes already sent by the application, the monitoring system may utilize existing techniques to reduce resource expenditure. However, some applications may support encrypting application traffic (e.g., messages to and from the application), which may result in an inability to monitor error response codes from the application and detect network attacks.

The techniques described herein may overcome the aforementioned technical deficiencies. For example, a computer, such as a probe, may operate to expose (e.g., make transparent, visible, accessible, etc.) error response codes. The probe may be an intermediary device between a client device and a server providing a service to the client device as part of a communication session. The probe may be further between the server and an encryption/decryption device. The probe may collect messages (e.g., signals, packets, requests, responses) associated with the communication session before being sent to the encryption/decryption device (e.g., before being encrypted, unencrypted messages). The probe may determine whether a message from the server includes a response code. Responsive to determining the message includes the response code, the probe may extract the response code. In some embodiments, the probe may modify the message to expose the response code. In some embodiments, the probe may generate a second message including the response code. The probe may send the modified message, the second message, or both, to an external device, such as a monitoring device. The monitoring device may receive the modified message, the second message, or both, and identify the exposed response code. By having the response code exposed, the monitoring device may identify malicious users and perform one or more preventative measures (e.g., block the malicious users) to stop network attacks.

To determine whether the message includes the response code, the computer may query a database. For example, the computer may query a database including multiple response identifiers. Each of the response identifiers may indicate a respective response type and a location of the response code within the message based on the response type. For example, the computer may extract a response identifier from the message. The computer may query the database using the response identifier. For instance, the database may indicate the identifier is associated with a DNS type. The database may indicate a location of the response code in DNS type messages. Based on the determined location, the computer may extract the response code (e.g., the bits or bytes associated with the location, the field associated with the location) from the message.

The computer may modify the message by inserting (e.g., encoding, placing, updating, generating) the response code or an indication of the response code in a header associated with the message. In some embodiments, the computer may insert the response code into an internet protocol (IP) header of the message. To do so, the computer may query a database including mappings between response codes and values using the response code. The computer may determine a respective value mapped to the response code. The computer may encode the respective value into a field of the IP header. In some embodiments, the computer may insert the response code into an encapsulation header of the message. To do so, the computer may encapsulate the message. The computer may insert the response code into a field of the encapsulation header.

In embodiments in which the computer generates a second message, the second message may be an out-of-band message. For example, the computer may generate the out-of-band message. The computer may extract an IP address of the client device associated with the message from the message. The computer may insert the IP address and the response code into the out-of-band message. The computer may send the out-of-band message to the external device via an alternate communication channel (e.g., out-of-band signaling or a communication channel other than the in-bound communication channel). In some embodiments, the computer may establish the alternate communication channel responsive to determining the message includes the response code. In some embodiments, the external device may establish the alternate communication channel or the alternate communication channel may already be established (e.g., regardless of determining the response code).

The techniques described herein may result in various advantages over the aforementioned technical deficiencies. For example, adopting the response code exposure process described herein may allow for a monitoring device to detect malicious network attacks without removing an encryption process or performing a decryption process, among other advantages.

FIG. 1 is an illustration of a system 100 for service response analysis, in accordance with an implementation. The system 100 may enable detection of DDoS attacks by exposing response codes. In brief overview, the system 100 can include, access, or otherwise interface with one or more of a data processing system 110 (e.g., a probe, an inspection device), that receives and/or stores data packets transmitted via a network 105 between client devices 106a-n (hereinafter client device 106 or client devices 106) and service providers 108a-n. The service providers 108 can each include a set of one or more servers 802, depicted in FIG. 8A, or a data center 808. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or directly.

Each of the client devices 106, the service providers 108, the computing device 102, and/or the data processing system 110 can include or utilize at least one processing unit or other logic device such as programmable logic array engine, or module configured to communicate with one another or other resources or databases. The components of the client devices 106, the service providers 108, the computing device 102, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The client devices 106, the service providers 108, the computing device 102, and/or the data processing system 110 can include or execute on one or more processors or computing devices (e.g., the computing device 803 depicted in FIG. 8C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be hosted by a third-party cloud service provider via a virtual environment. The service provider 108 can be hosted in a public cloud, a co-location facility, or a private cloud. The service provider 108 can be hosted in a private data center, or on one or more physical servers, virtual machines, or containers of an entity or customer. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network and is also referred to as a communications network service. Examples of services include 5 G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 810 depicted in FIG. 8B.

The client device 106 can establish communication sessions with the service providers 108 to receive data from the service providers 108. For example, a user associated with the client device 106 may request a service. Responsive to the request, a cloud provider 108 associated with the service may send requested data to the client device 106 in a communication session. In some cases, the request may be a bad request. For example, the request may be a nonexistent DNS query. The cloud provider 108 may send a response including an NXDOMAIN error (e.g., a response code). Each type of incorrect request may be associated with a respective response code. The client devices 106 may establish communication sessions with the cloud providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 810 depicted in FIG. 8B). If the client device 106 is deployed in a cloud 810, the client device 106 can include or be referred to as a virtual client device or virtual machine. In the event the client device 106 is deployed in a cloud 810, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 810 on the same computing host in an infrastructure 816 (described below with respect to FIG. 8B).

The data processing system 110 may comprise one or more processors that are configured to obtain network data packets from the service providers 108 during a communication session between the client device 106 and the service providers 108 and expose response codes associated with the network data packets. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a response code manager 124, a response identifier database 126, a response code mapper 128, a mapping database 130, a packet encoder 132, and an exporter 134. The data processing system 110 may further include other components, managers, handlers, etc. to perform the techniques as described herein. In brief overview, the components 122-134 may obtain a network data packet associated with a communication session between the client device 106 and a network service provider (e.g., the service providers 108). The components 122-134 may determine whether the network data packet includes a response code indicating a status of the communication session. Responsive to determining the network data packet includes the response code, the components 122-134 may extract the response code from the network data packet. The components 122-134 may modify the network data packet based on the response code or generate an out-of-band message based on the response code. The components 122-134 may send the modified network data packet or the out-of-band message to an external device.

The data collector 122 may comprise programmable instructions that, upon execution, cause the processor 118 to obtain (e.g., receive, collect) data transmitted between the client devices 106 and the service providers 108 as part of a communication session. For example, the client device 106 may send a request for a service to the service provider 108. The service provider 108 may send a response to provide the service to the client device 106. The data collector 122 may receive the request from the service provider 108. In some cases, the response may be unencrypted (e.g., clear text traffic). For example, the data collector 122 may obtain the response before an encryption device applies an encryption process to the response. In some cases, the request may be associated with a normal request for the service, or the request may be associated with a malicious attack.

The response code manager 124 may comprise programmable instructions that, upon execution, cause the processor 118 to determine whether the request includes a response code. To do so, the response code manager 124 may communicate with the response identifier database 126. The response identifier database 126 may be a database (e.g., relational, non-relational, object oriented) that stores response identifiers. The response identifiers may be service response identifiers including information about service response types and locations of service response codes in a service response. For example, a service response identifier may include a DNS service response type and an indication of a field (e.g., dns.flags.rcode) of the DNS response message where DNS response codes are located. The response code manager 124 may extract (e.g., determine) an identifier of the obtained response. The response code manager 124 may query the response identifier database 126 using the identifier. The response code manager 124 may obtain the type of the response (e.g., DNS, HTTP, etc.) and a location of the response code within the response.

Because the response is not yet encrypted, the response code manager 124 may inspect the response. The response code manager 124 may inspect the response based on the location of the response code within the response. For example, the response code manager 124 may inspect the field of the response associated with the location. If the field includes a response code (e.g., a service response code, data other than null), the response code manager 124 may determine the response includes a response code. If the field does not include a response code, the response code manager 124 may forward the response (e.g., without modifying the response) to the computing device 102 (e.g., to continue the communication session between the client device 106 and the service providers 108). In some cases, the response code manager 124 may encapsulate the response before forwarding to the computing device 102. Responsive to determining the response includes the response code, the response code manager 124 may extract the response code. For example, the response code manager 124 may extract the response code from the location obtained from the response identifier database 126.

The response code mapper 128 may comprise programmable instructions that, upon execution, cause the processor 118 to query the mapping database 130. The mapping database 130 may be a database (e.g., relational, non-relational, object oriented) that stores mappings between response codes and values (e.g., defined mapping values). The values may be pre-defined numbers mapped to each response code according to a protocol. For example, a DNS response code may be NXDOMAIN. The protocol may indicate that NXDOMAIN is equal to 2. The response code mapper 128 may query the mapping database 130 using the response code (e.g., NXDOMAIN) and may receive the value mapped to the response code (e.g., 2) from the database 130. In this way, the response code mapper 128 may generate an indication of the response code (e.g., reduced bits of information) to insert into the response regardless of response type (e.g., standardized across all response types).

The packet encoder 132 may comprise programmable instructions that, upon execution, cause the processor 118 to modify the response (e.g., the network data packet) based on the response code or generate an out-of-band response message including the response code. To modify the response, the packet encoder 132 may modify a header of the response. The header may be an IP header of the response or an encapsulation header encapsulating the response.

In some implementations, to modify the IP header, the packet encoder 132 may encode the response code or the indication of the response code (e.g., from the response code mapper 128) into a field of the IP header. The IP header may be a header of the response that includes various fields indicating data about the response (e.g., identification, length, destination, source, differentiated service code point (DSCP) values, explicit congestion notification (ECN) flags, IP options, etc.).

In some embodiments, the packet encoder 132 may encode the indication of the response code in the DSCP field. For example, the DSCP field may be visible in encrypted traffic (e.g., the packet load and a portion of the IP header may be encrypted but the DSCP field may remain unencrypted). The DSCP field may include flags of a number of bits (e.g., 6 bits). The flags may include a lower portion and an upper portion. The lower portion (e.g., 1 bit, 2 bits) may indicate which DSCP codepoint the upper portion is associated with. For example, a first codepoint may be standards action (e.g., bit value of xxxxx0) for quality of service (QoS) signaling, a second codepoint may be for experimental or local use (e.g., bit value xxxx11), and a third codepoint may be for standards action (e.g., bit value xxxx01). The packet encoder 132 may encode the lower portion of the DSCP field to indicate the second codepoint and encode the upper portion of the DSCP field with the indication of the response code. For example, if the response code is NXDOMAIN and the indication of the response code is 2, the packet encoder 132 may encode the DSCP field to be 001011 (e.g., decimal 11, hex 0×B). Although the example of NXDOMAIN and the second codepoint of DSCP is used herein as an example, it is understood other IP header fields and codepoint configurations may be used to expose the response code in the response.

In some implementations, to modify the encapsulation header, the packet encoder 132 may encode the response code or the indication of the response code (e.g., from the response code mapper 128) into a field of the encapsulation header. For example, the packet encoder 132 may encapsulate the response based on a first type of encapsulation protocol (e.g., virtual extensible local area network (VXLAN), generic routing encapsulation (GRE), etc.). The packet encoder 132 may modify the header of the first type of encapsulation protocol. For instance, the packet encoder 132 may set a VXLAN flag to indicate an abnormal VXLAN header (e.g., set VXLAN flag to 0). The packet encoder 132 may insert the response code into a VXLAN field (e.g., VXLAN network identifier (VNI) field supporting up to 24 bytes) based on setting the VXLAN flag.

In some embodiments, to generate the out-of-band response message, the response code manager 124 may extract an IP address of the client device 106 from the response. For example, the response may be directed to the client device 106. The response may include the IP address of the client device 106 in a field (e.g., a header field) of the response. The response code manager 124 may extract the data included in the IP address field (e.g., a destination field). The packet encoder 132 may generate the out-of-band response message to include the IP address and the response code.

The exporter 134 may comprise executable instructions that, upon execution by the processor 118, may send (e.g., export, provide, transmit) the modified response (e.g., the response with a modified IP header, the response with a modified encapsulation header), the out-of-band response message, or both, to the computing device 102. In some embodiments, the data processing system 110 may communicate with the service providers 108, the client devices 106, and/or the computing device 102 via a first type of communication channel (e.g., an in-band communication channel). The data processing system 110 may establish a second type of communication channel (e.g., an out-of-band communication channel) between the data processing system 110 and the computing device 102 (e.g., using a communication method, inter-device communication method, TCP socket, Kafka message bus, etc.). For example, the second type of communication channel may circumvent an encryption process (e.g., go around, skip). The exporter 134 may send the out-of-band response message to the computing device 102 via the second type of communication channel. By doing so, the data processing system 110 may enable the computing device 102 to determine the response code and IP address in the out-of-band response message without decrypting the message, which may result in the computing device 102 determining malicious activity and performing one or more preventative measures (e.g., block the client device 106, rate limit the client device 106, etc.). Similarly, by sending the modified response to the computing device 102, the computing device 102 may determine the response code in the modified header (e.g., the IP header, the encapsulation header) without decrypting the message (e.g., without being configured with keys associated with the communication session).

Figure 2:
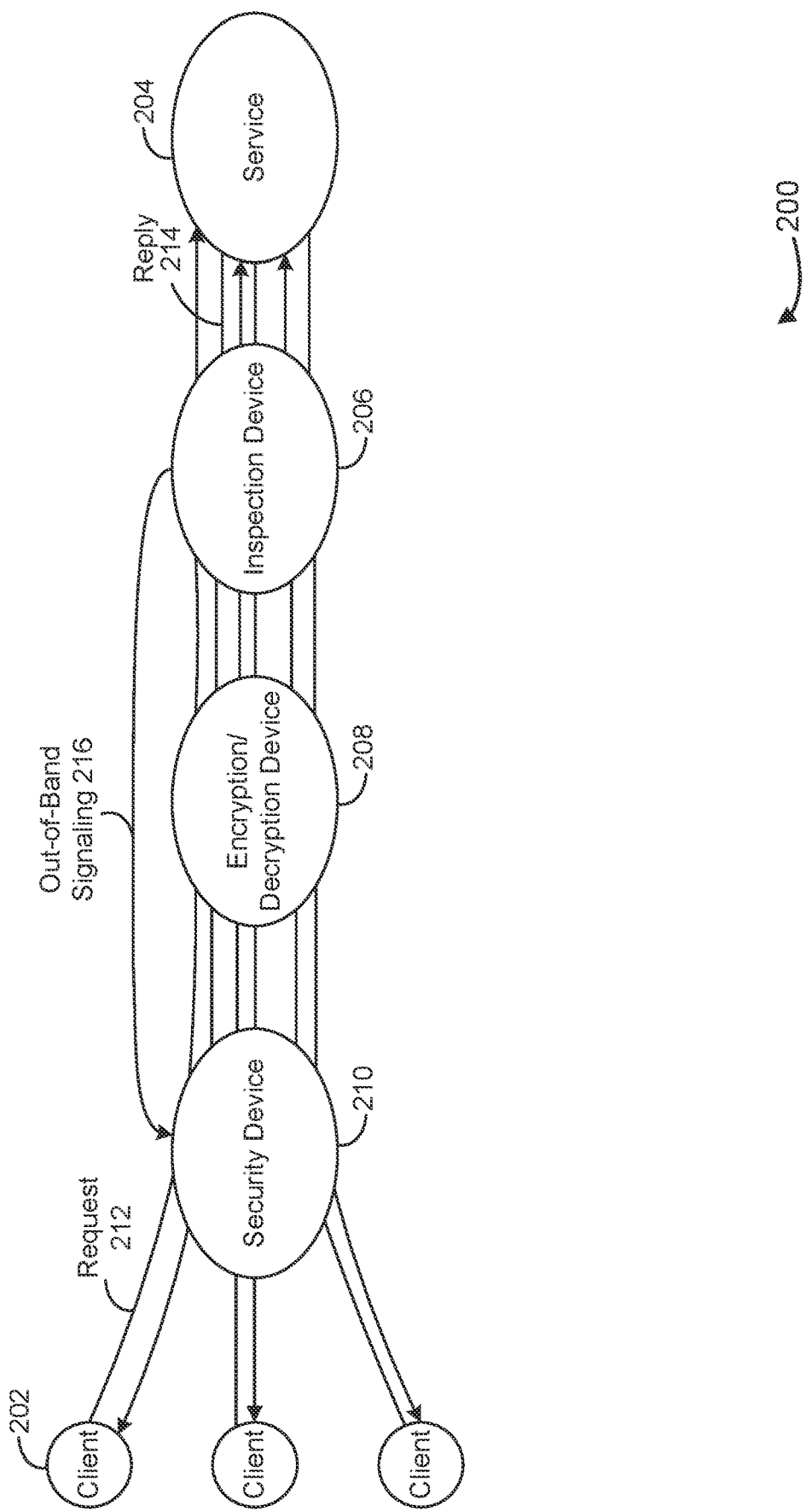
FIG. 2 is an illustration of a system for service response analysis, in accordance with an implementation.

FIG. 2 is an illustration of a system 200 for service response analysis, in accordance with an implementation. The system 200 may include a client device 202, a service provider 204, an inspection device 206, an encryption/decryption device 208, and a security device 210, which may be respective examples of (e.g., similar to, same as) the client device 106, the service provider 108, the data processing system 110, and the computing device 102. In some cases, the security device 210, the encryption/decryption device 208, and the inspection device 206 may be intermediary devices between the client device 202 and the service provider 204 (e.g., devices to relay or communicate messages between the client device 202 and the service provider 204). In some cases, the service provider 204, the inspection device 206, the encryption/decryption device 208, the security device 210, or any combination thereof, may include, share, or interface with components of each respective device. For example, the service provider 204 may include the inspection device 206 and the encryption/decryption device 208, where the inspection device 206 and the encryption/decryption device 208 may be a process or program (e.g., software) stored (e.g., running) on the service provider 204, which may allow the inspection device 206 access to clear text traffic within the same device.

The client device 202, the service provider 204, the inspection device 206, the encryption/decryption device 208, and the security device 210 may be in communication with each other. In some cases, the devices may communicate via a first type of communication channel (e.g., an in-band channel). In some cases, the inspection device 206 and the security device 210 may communicate via a second type of communication channel (e.g., an out-of-band channel). The client device 202 may send one or more requests 212 (e.g., network data packets, messages, signaling) to the service provider 204 via the intermediary devices. The service provider 204 may receive the requests 212 and send one or more responses 214 (e.g., replies) to the client device 202 via the intermediary devices.

In some embodiments, the inspection device 206 may obtain the responses 214. The inspection device 206 may determine whether the responses 214 include a response code indicating a status of the requests 212 (e.g., whether the request 212 has been successfully completed or not). In some cases, the inspection device 206 may determine a first response 214 does not include the response code. For instance, the first response 214 may be a first of multiple responses 214 to a same request 212. The first response 214 may not include a response code, and instead, a second response 214 (e.g., a last response of the multiple responses 214) may include the response code. The inspection device 206 may forward the first response 214 to the encryption/decryption device 208 (e.g., without modification). In some embodiments, the inspection device 206 may encapsulate the first response 214 before forwarding. In some cases, the inspection device 206 may determine the first response 214 includes the response code. The inspection device 206 may communicate with one or more databases to extract the response code, as described herein with reference to FIG. 1. The inspection device 206 may modify a header (e.g., IP header, encapsulation header) of the first response 214 based on the response code or generate out-of-band signaling 216 (e.g., an out-of-band response message) based on the response code, as described herein with reference to FIG. 1.

In some cases, the inspection device 206 may send the first response 214 with the modified header to the encryption/decryption device 208. The encryption/decryption device 208 may encrypt the first response 214 (e.g., except for the response code in the modified header) and send the encrypted first response 214 to the security device 210. The security device 210 may determine the unencrypted response code in the modified header and determine whether the request 212 associated with the first response 214 is a malicious request. In some cases, the inspection device 206 may send the out-of-band signaling 216 including the response code and an IP address of the client device 202 to the security device 210. The security device 210 may receive the out-of-band signaling 216 with the unencrypted response code and determine whether the request 212 associated with the first response 214 is a malicious request.

Figure 3:
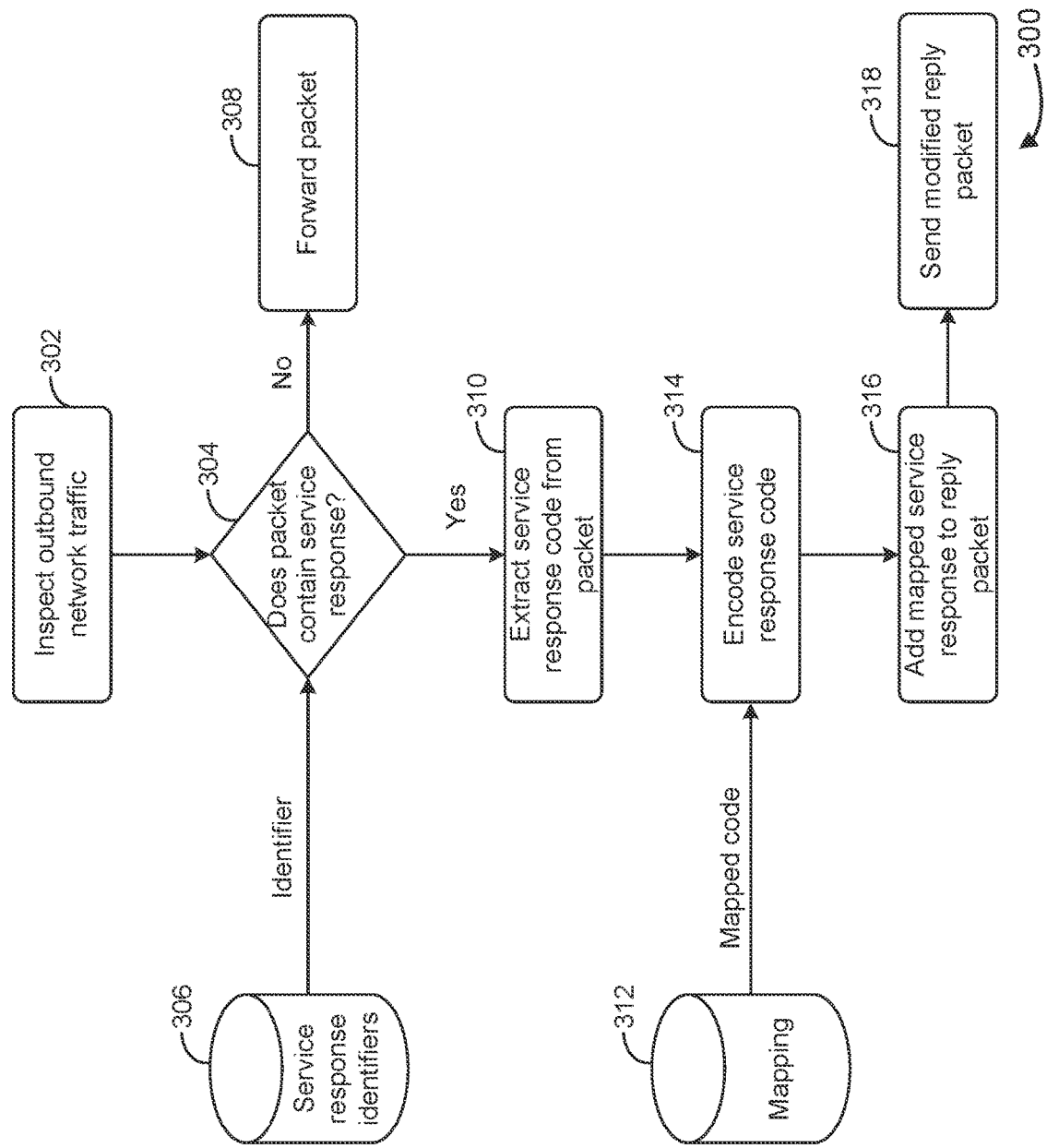
FIG. 3 is an illustration of a flow diagram of a process for service response analysis, in accordance with an implementation.

FIG. 3 is an illustration of a flow diagram of a process 300 for service response analysis, in accordance with an implementation. The process 300 can be performed by a data processing system (the data processing system 110, shown and described with reference to FIG. 1). The process 300 may include more or fewer operations and the operations may be performed in any order. Performance of the process 300 may enable the data processing system to expose response codes to a monitoring device.

At operation 302, the data processing system can inspect outbound network traffic (e.g., each packet of the network traffic). A service provider may transmit the outbound network traffic. The outbound network traffic may be intended for a client device. The outbound network traffic may be a response to a request from the client device. The data processing system may receive the response and determine a type of the response (e.g., HTTP, DNS, etc.).

At operation 304, the data processing system can determine whether a packet of the outbound network traffic includes a service response. To do so, at operation 306, the data processing system can query a first database. The first database may include service response identifiers. The service response identifiers may include information indicating a type of service response and a location of response codes in responses (e.g., messages, packets) associated with the type of service response. The data processing system can query the first database using the determined type of response (e.g., a response identifier). The data processing system may determine the type of service response associated with the response and the location of the response code in the response based on the query. The data processing system can inspect the location of the response code (e.g., a field including the response code) to determine if the response includes a response code. If the response does not include the response code, at operation 308, the data processing system can forward the packet, without modification, to an external device (e.g., a monitoring device, a security device, an encryption device). If the response does include the response code, the data processing system may continue to operation 310.

At operation 310, the data processing system can extract the response code (e.g., a service response code) from the response (e.g., a network data packet). At operation 312, the data processing system can query a second database. The second database may include mappings between response codes and defined values. For example, the mapping may be based on a pre-defined standard of response codes to values. Each response code (e.g., including response codes for various types of responses) may correspond to a defined value (e.g., {NXDOMAIN, 2}, {404 error, 4}, etc.). The data processing system can query the second database using the extracted response code. The data processing system can determine a first value associated with the extracted response code based on the query.

At operation 314, the data processing system can encode the response code into the response. To do so, at operation 316, the data processing system can encode the first value into the response. In some cases, the data processing system can encode the first value into an IP header of the response. To do so, the data processing system can set a lower portion of an IP header field to a value indicating a first codepoint and encode the first value into an upper portion of the IP header filed. At operation 318, the data processing system can send the response including the modified header to the external device.

Figure 4:
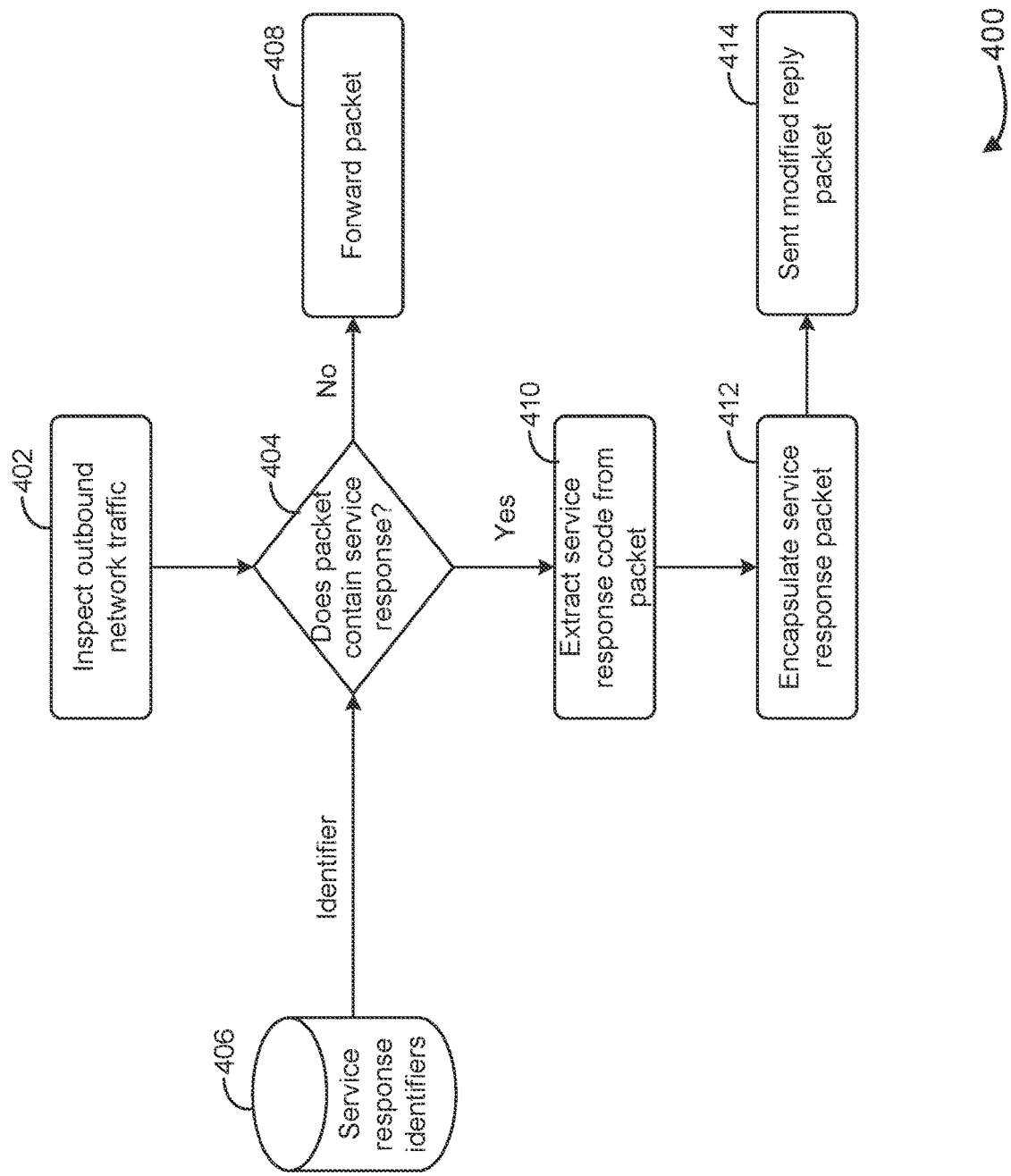
FIG. 4 is an illustration of a flow diagram of a process for service response analysis, in accordance with an implementation.

FIG. 4 is an illustration of a flow diagram of a process 400 for service response analysis, in accordance with an implementation. The process 400 can be performed by a data processing system (the data processing system 110, shown and described with reference to FIG. 1). The process 400 may include more or fewer operations and the operations may be performed in any order. Performance of the process 400 may enable the data processing system to expose response codes to a monitoring device.

At operation 402, the data processing system can inspect outbound network traffic (e.g., each packet of the network traffic). A service provider may transmit the outbound network traffic. The outbound network traffic may be intended for a client device. The outbound network traffic may be a response to a request from the client device. The data processing system may receive the response and determine a type of the response (e.g., HTTP, DNS, etc.).

At operation 404, the data processing system can determine whether a packet of the outbound network traffic includes a service response. To do so, at operation 406, the data processing system can query a first database. The first database may include service response identifiers. The service response identifiers may include information indicating a type of service response and a location of response codes in responses (e.g., messages, packets) associated with the type of service response. The data processing system can query the first database using the determined type of response (e.g., a response identifier). The data processing system may determine the type of service response associated with the response and the location of the response code in the response based on the query. The data processing system can inspect the location of the response code (e.g., a field including the response code) to determine if the response includes a response code. If the response does not include the response code, at operation 408, the data processing system can forward the packet, without modification, to an external device (e.g., a monitoring device, a security device, an encryption device). If the response does include the response code, the data processing system may continue to operation 410.

At operation 410, the data processing system can extract the response code (e.g., a service response code) from the response (e.g., a network data packet). At operation 412, the data processing system can encapsulate the response according to an encapsulation protocol. To do so, the data processing system can modify a header of the encapsulation protocol. The data processing system can encode the response code into a field of the header and set a flag of the header to indicate the header is a modified header. The data processing system can encapsulate the response with the modified header. At operation 414, the data processing system can send the response including the modified header to the external device.

Figure 5:
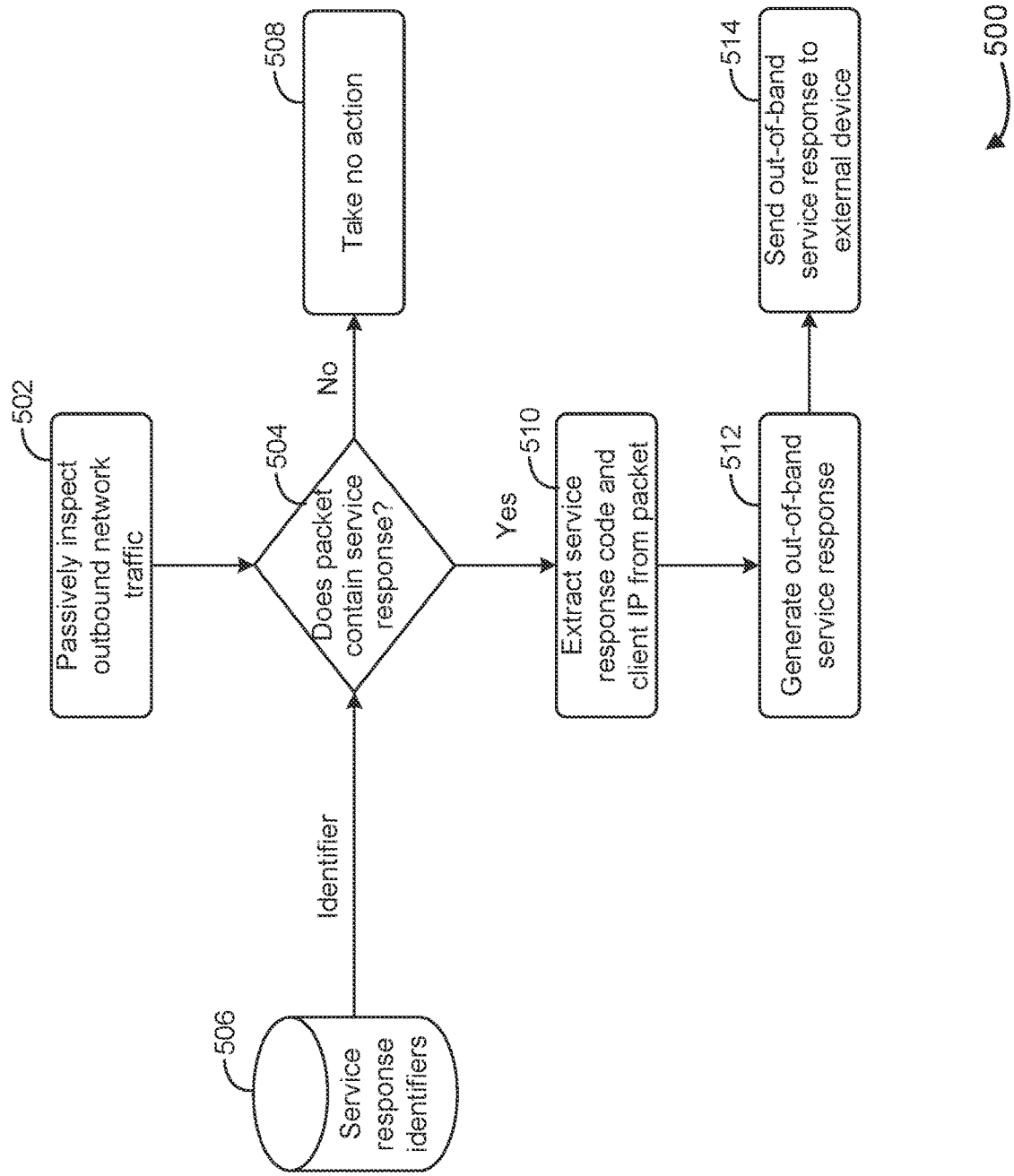
FIG. 5 is an illustration of a flow diagram of a process for service response analysis, in accordance with an implementation.

FIG. 5 is an illustration of a flow diagram of a process 500 for service response analysis, in accordance with an implementation. The process 500 can be performed by a data processing system (the data processing system 110, shown and described with reference to FIG. 1). The process 500 may include more or fewer operations and the operations may be performed in any order. Performance of the process 500 may enable the data processing system to expose response codes to a monitoring device.

At operation 502, the data processing system can inspect outbound network traffic. A service provider may transmit the outbound network traffic. The outbound network traffic may be intended for a client device. The outbound network traffic may be a response to a request from the client device. The data processing system may receive the response and determine a type of the response (e.g., HTTP, DNS, etc.).

At operation 504, the data processing system can determine whether a packet of the outbound network traffic includes a service response. To do so, at operation 506, the data processing system can query a first database. The first database may include service response identifiers. The service response identifiers may include information indicating a type of service response and a location of response codes in responses (e.g., messages, packets) associated with the type of service response. The data processing system can query the first database using the determined type of response (e.g., a response identifier). The data processing system may determine the type of service response associated with the response and the location of the response code in the response based on the query. The data processing system can inspect the location of the response code (e.g., a field including the response code) to determine if the response includes a response code. If the response does not include the response code, at operation 508, the data processing system can forward the packet, without modification, to an external device (e.g., a monitoring device, a security device, an encryption device). If the response does include the response code, the data processing system may continue to operation 510.

At operation 510, the data processing system can extract the response code (e.g., a service response code) and an IP address associated with the client device from the response (e.g., a network data packet). At operation 512, the data processing system can generate an out-of-band response message. The out-of-band response message may include the response code and the IP address. At operation 514, the data processing system can send the out-of-band response message including the response code to the external device via an out-of-band channel (e.g., a TCP socket, a message bus). By sending the out-of-band response message via the out-of-band channel (e.g., rather than via an in-band channel), the external device can receive the out-of-band response message without encryption, or the out-of-band response message may be encrypted according to a predefined encryption protocol configured at the external device (e.g., such that the external device can decrypt the out-of-band response message and determine the response code).

Figure 6:
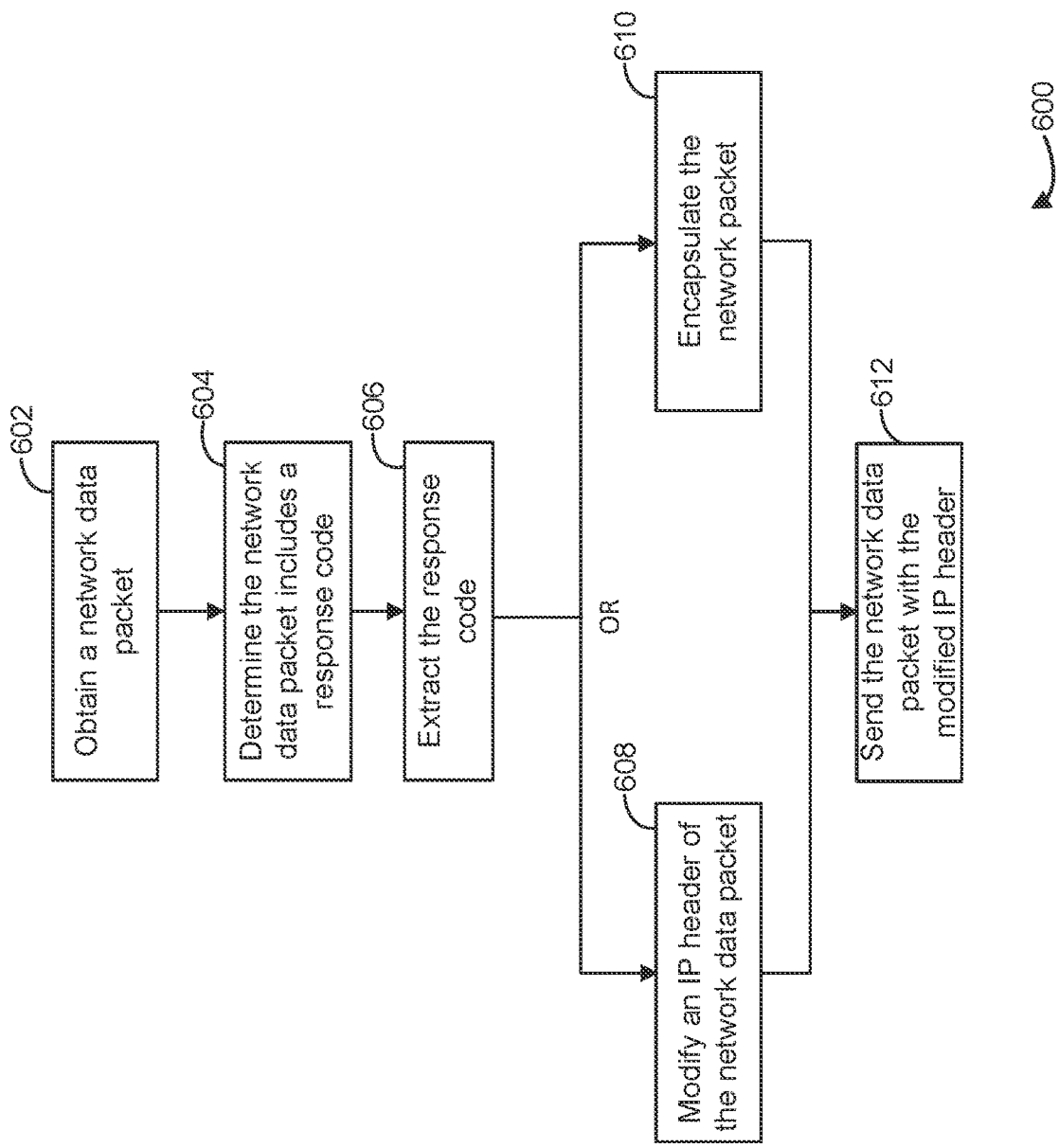
FIG. 6 is a method for service response analysis, in accordance with an implementation.

FIG. 6 is a method 600 for transparent service response analysis, in accordance with an implementation. The method 600 can be performed by one or more system, component or module depicted in FIGS. 1-8C, including, for example, a data processing system or service of a cloud service provider system. The method 600 may include more or fewer operations and the operations may be performed in any order. Performance of the method 600 may enable the data processing system to detect DDoS attacks and perform one or more countermeasures to protect against the attacks.

At operation 602, the data processing system can obtain a network data packet from a network service provider. The network data packet may be a response to a request. For example, the request may be from a client device and the response may be from a server as part of a communication session. In some embodiments, the data processing system can obtain a second network data packet from the network service provider. The second network data packet may be a second response to a second request. The data processing system can forward, responsive to determining the second network data packet does not include a response code, the second network data packet to the external device without modifying a second IP header of the second network data packet.

At operation 604, the data processing system can determine the network data packet includes a response code indicating a status of the request. In some embodiments, the data processing system can query a database including multiple response identifiers. Each of the response identifiers may indicate a respective response type and a location of the response code within the network data packet based on the respective response type. In some embodiments, the response code may include an error response code. The error response code may be associated with, for example, DNS error response code, an HTTP error response code, file transfer protocol (FTP) error response code, a simple mail transfer protocol (SMTP) error response code, an internet message access protocol (IMAP) error response code, or an internet control message protocol (ICMP) error response code, or other response codes depending on the service.

At operation 606, the data processing system can extract the response code from the network data packet, responsive to the determining the network data packet includes the response code. In some embodiments, the data processing system can query, responsive to extracting the response code, a database including multiple mappings between multiple response codes and multiple values. The data processing system can determine a value of the multiple values indicating the response code based on the querying. In some embodiments, the data processing system may continue to either the operation 608 or the operation 610.

At operation 608, the data processing system can modify an IP header of the network data packet based on the response code. In some embodiments, the data processing system can modify the IP header by encoding the value into a field of the IP header. In some embodiments, the data processing system can encode the value into a number of bits in an upper portion of the field. The field may be a DSCP of the IP header. In some embodiments, the network data packet may include a first portion including the modified IP header and a second portion different from the first portion. The data processing system can encrypt the second portion of the network data packet without encrypting the first portion of the network data packet.

At operation 610, the data processing system can encapsulate the network data packet based on the response code. In some embodiments, the data processing system can insert the response code into a first type of encapsulation header. The data processing system can encapsulate the network data packet with the first type of encapsulation header. In some embodiments, the first type of encapsulation header is one of a VXLAN header, a GRE header, a multiprotocol label switching (MPLS) header, an internet protocol security (IPsec) header, or a layer 2 tunneling protocol (L2TP) header, or another type of encapsulation header. In some embodiments, the data processing system can insert the response code into a VNI field of the first type of encapsulation header, where the first type of encapsulation header is a VXLAN header. At operation 612, the data processing system can send, to an external device, the network data packet with the modified IP header.

FIG. 7 is a method 700 for service response analysis via out-of-band signaling, in accordance with an implementation. The method 700 can be performed by one or more system, component or module depicted in FIGS. 1-8C, including, for example, a data processing system or service of a cloud service provider system. The method 700 may include more or fewer operations and the operations may be performed in any order. Performance of the method 700 may enable the data processing system to detect DDoS attacks and perform one or more countermeasures to protect against the attacks.

At operation 702, the data processing system can obtain a network data packet from a network service provider. The network data packet may be a response to a request. For example, the request may be from a client device and the response may be from a server as part of a communication session. In some embodiments, the data processing system can obtain a second network data packet from the network service provider. The second network data packet may be a second response to a second request. The data processing system can forward, responsive to determining the second network data packet does not include a response code, the second network data packet to the external device without modifying a second IP header of the second network data packet.

At operation 704, the data processing system can determine the network data packet includes a response code indicating a status of the request. In some embodiments, the data processing system can query a database including multiple response identifiers. Each of the response identifiers may indicate a respective response type and a location of the response code within the network data packet based on the respective response type. In some embodiments, the response code may include an error response code. The error response code may be associated with, for example, DNS error response code, an HTTP error response code, a FTP error response code, a SMTP error response code, an IMAP error response code, or an ICMP error response code, or other response codes depending on the service.

At operation 706, the data processing system can extract the response code from the network data packet, responsive to the determining the network data packet includes the response code. In some embodiments, the data processing system can extract, an IP address of the client from the network data packet. At operation 708, the data processing system can generate an out-of-band response message including the response code. In some embodiments, the out-of-band response message may include the IP address of the client.

At operation 710, the data processing system can send, to an external device via a second network channel, the out-of-band response message including the response code. In some embodiments, the first network channel is an in-band network channel, and the second network channel is an out-of-band network channel. In some embodiments, the out-of-band network channel is associated with at least one of a TCP socket, a message bus, a web socket, or simple network management protocol (SNMP) traps, or another type of out-of-band channel.

Figure 8A:
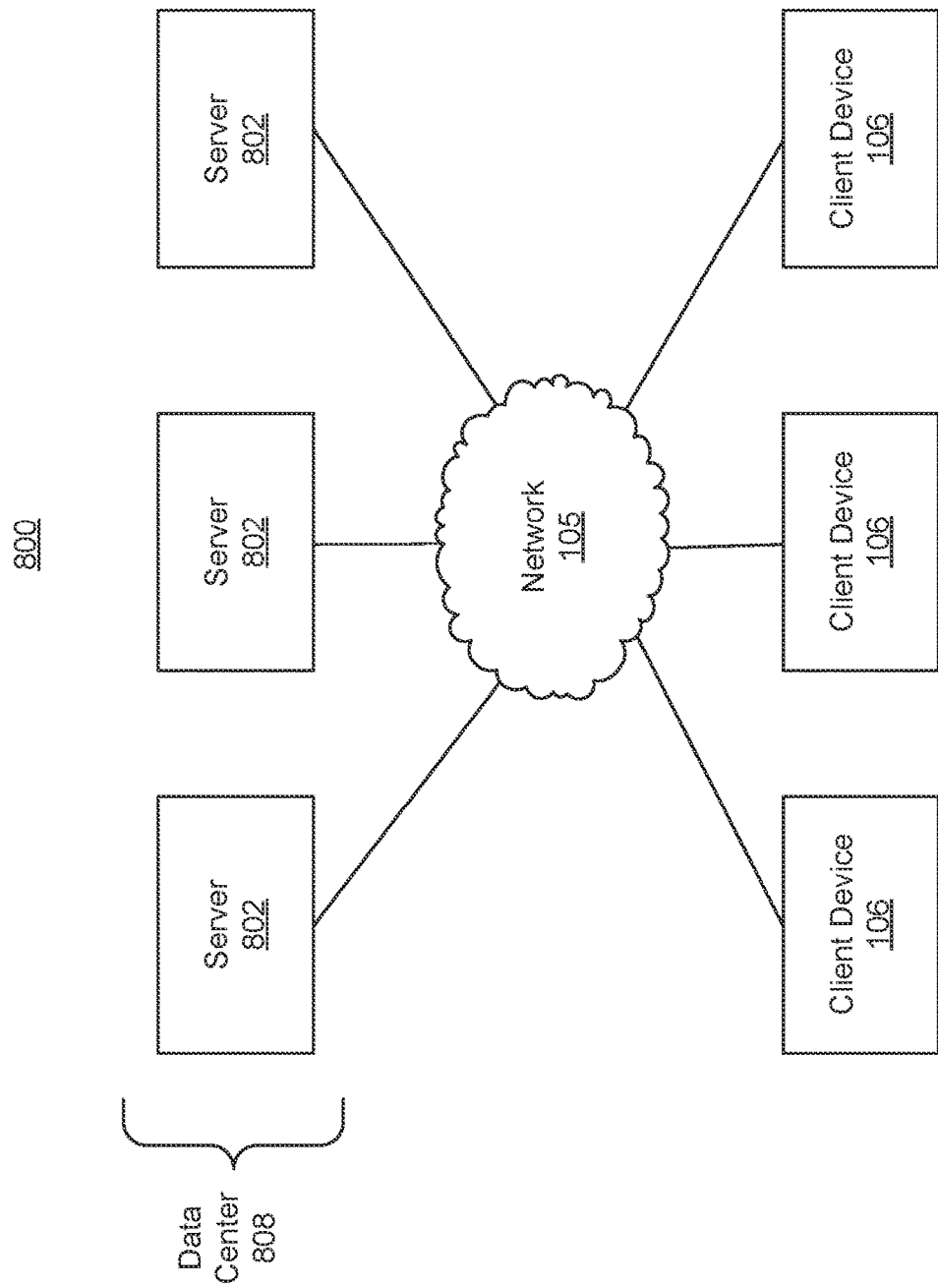
FIG. 8A is a block diagram depicting an implementation of a network environment including a client device in communication with a server device.

FIG. 8A depicts an example network environment that can be used in connection with the methods and systems described herein. In brief overview, the network environment 800 includes one or more client devices 106 (also generally referred to as clients, client node, client machines, client computers, client computing devices, endpoints, or endpoint nodes) in communication with one or more servers 802 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 8A shows a network 105 between the client devices 106 and the servers 802, the client devices 106 and the servers 802 can be on the same network 105. In embodiments, there are multiple networks 105 between the client devices 106 and the servers 802. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5 G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 800 can include multiple, logically grouped servers 802. The logical group of servers can be referred to as a data center 808 (or server farm or machine farm). In embodiments, the servers 802 can be geographically dispersed. The data center 808 can be administered as a single entity or different entities. The data center 808 can include multiple data centers 808 that can be geographically dispersed. The servers 802 within each data center 808 can be homogeneous or heterogeneous (e.g., one or more of the servers 802 or machines 802 can operate according to one type of operating system platform (e.g., WINDOWS NT, manufactured by Microsoft Corp. of Redmond, Washington), while one or more of the other servers 802 can operate on according to another type of operating system platform (e.g., Unix, Linux, or Mac OS X)). The servers 802 of each data center 808 do not need to be physically proximate to another server 802 in the same machine farm 808. Thus, the group of servers 802 logically grouped as a data center 808 can be interconnected using a network. Management of the data center 808 can be de-centralized. For example, one or more servers 802 can comprise components, subsystems and modules to support one or more management services for the data center 808.

Server 802 can be a file server, application server, web server, proxy server, appliance, network appliance, gateway, gateway server, virtualization server, deployment server, SSL VPN server, or firewall. In embodiments, the server 802 can be referred to as a remote machine or a node. Multiple nodes can be in the path between any two communicating servers.

FIG. 8B illustrates an example cloud computing environment. A cloud computing environment 801 can provide client 106 with one or more resources provided by a network environment. The cloud computing environment 801 can include one or more client devices 106, in communication with the cloud 810 over one or more networks 105. Client devices 106 can include, e.g., thick clients, thin clients, and zero clients. A thick client can provide at least some functionality even when disconnected from the cloud 810 or servers 802. A thin client or a zero client can depend on the connection to the cloud 810 or server 802 to provide functionality. A zero client can depend on the cloud 810 or other networks 105 or servers 802 to retrieve operating system data for the client device. The cloud 810 can include back-end platforms, e.g., servers 802, storage, server farms or data centers.

The cloud 810 can be public, private, or hybrid. Public clouds can include public servers 802 that are maintained by third parties to the client devices 106 or the owners of the clients. The servers 802 can be located off-site in remote geographical locations as disclosed above or otherwise. Public clouds can be connected to the servers 802 over a public network. Private clouds can include private servers 802 that are physically maintained by client devices 106 or owners of clients. Private clouds can be connected to the servers 802 over a private network 105. Hybrid clouds 808 can include both the private and public networks 105 and servers 802.

The cloud 810 can also include a cloud-based delivery, e.g., Software as a Service (Saas) 812, Platform as a Service (PaaS) 814, and the Infrastructure as a Service (IaaS) 816. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 802 can be deployed as and/or executed on any type and form of computing device, e.g., a computer, network device or appliance capable of communicating on any type and form of network and performing the operations described herein.

Figure 8C:
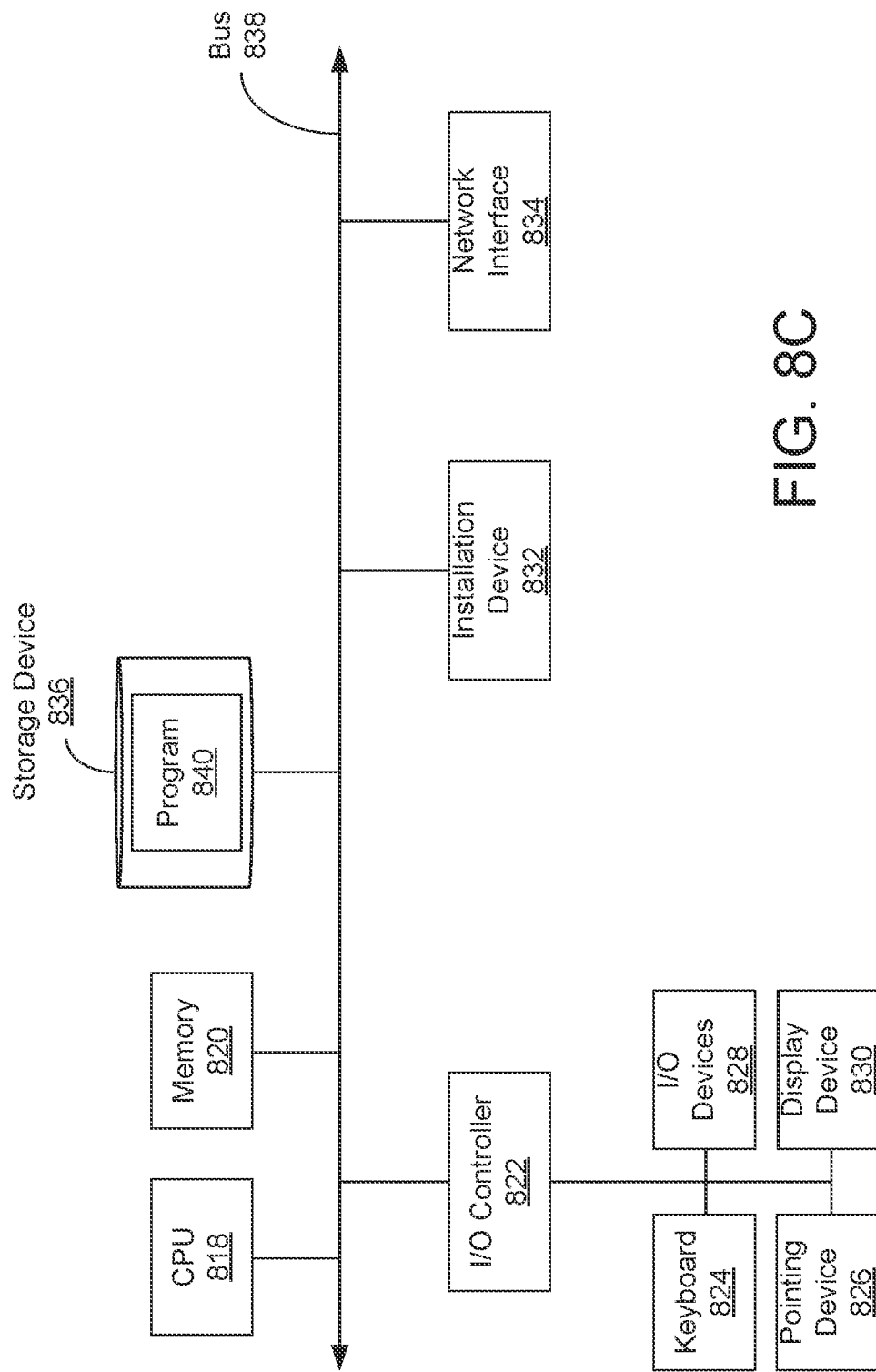
FIG. 8C is a block diagram depicting an implementation of a computing device that can be used in connection with the systems depicted in FIGS. 1 and 2, and the methods depicted in FIGS. 3-7.

FIG. 8C depicts block diagrams of a computing device 803 useful for practicing an embodiment of the client 106 or a server 802. As shown in FIG. 8C, each computing device 803 can include a central processing unit 818, and a main memory unit 820. As shown in FIG. 8C, a computing device 803 can include one or more of a storage device 836, an installation device 832, a network interface 834, an I/O controller 822, a display device 830, a keyboard 824 or a pointing device 826, e.g., a mouse. The storage device 836 can include, without limitation, a program 840, such as an operating system, software, or software associated with system 100.

The central processing unit 818 is any logic circuitry that responds to and processes instructions fetched from the main memory unit 820. The central processing unit 818 can be provided by a microprocessor unit, e.g.: those manufactured by Intel Corporation of Mountain View, California. The computing device 803 can be based on any of these processors, or any other processor capable of operating as described herein. The central processing unit 818 can utilize instruction level parallelism, thread level parallelism, different levels of cache, and multi-core processors. A multi-core processor can include two or more processing units on a single computing component.

Main memory unit 820 can include one or more memory chips capable of storing data and allowing any storage location to be directly accessed by the microprocessor 818. Main memory unit 820 can be volatile and faster than storage 836 memory. Main memory units 820 can be Dynamic random-access memory (DRAM) or any variants, including static random access memory (SRAM). The memory 820 or the storage 836 can be non-volatile; e.g., non-volatile read access memory (NVRAM). The memory 820 can be based on any type of memory chip, or any other available memory chips. In the example depicted in FIG. 8C, the processor 818 can communicate with memory 820 via a system bus 838.

A wide variety of I/O devices 828 can be present in the computing device 803. Input devices 828 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 828 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 828, display devices 830 or group of devices can be augmented reality devices. The I/O devices can be controlled by an I/O controller 822 as shown in FIG. 8C. The I/O controller 822 can control one or more I/O devices, such as, e.g., a keyboard 824 and a pointing device 826, e.g., a mouse or optical pen. Furthermore, an I/O device can also provide storage and/or an installation device 832 for the computing device 803. In embodiments, the computing device 803 can provide USB connections (not shown) to receive handheld USB storage devices. In embodiments, an I/O device 828 can be a bridge between the system bus 838 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 830 can be connected to I/O controller 822. Display devices can include, e.g., liquid crystal displays (LCD), electronic papers (e-ink) displays, flexile displays, light emitting diode displays (LED), or other types of displays. In some embodiments, display devices 830 or the corresponding I/O controllers 822 can be controlled through or have hardware support for OPENGL or DIRECTX API or other graphics libraries. Any of the I/O devices 828 and/or the I/O controller 822 can include any type and/or form of suitable hardware, software, or combination of hardware and software to support, enable or provide for the connection and use of one or more display devices 830 by the computing device 803. For example, the computing device 803 can include any type and/or form of video adapter, video card, driver, and/or library to interface, communicate, connect or otherwise use the display devices 830. In embodiments, a video adapter can include multiple connectors to interface to multiple display devices 830.

The computing device 803 can include a storage device 836 (e.g., one or more hard disk drives or redundant arrays of independent disks) for storing an operating system or other related software, and for storing application software programs 840 such as any program related to the systems, methods, components, modules, elements, or functions depicted in FIG. 1, or 2. Examples of storage device 836 include, e.g., hard disk drive (HDD); optical drive including CD drive, DVD drive, or BLU-RAY drive; solid-state drive (SSD); USB flash drive; or any other device suitable for storing data. Storage devices 836 can include multiple volatile and non-volatile memories, including, e.g., solid state hybrid drives that combine hard disks with solid state cache. Storage devices 836 can be non-volatile, mutable, or read-only. Storage devices 836 can be internal and connect to the computing device 803 via a bus 838. Storage device 836 can be external and connect to the computing device 803 via an I/O device 830 that provides an external bus. Storage device 836 can connect to the computing device 803 via the network interface 834 over a network 105. Some client devices 106 may not require a non-volatile storage device 836 and can be thin clients or zero client devices 106. Some storage devices 836 can be used as an installation device 832 and can be suitable for installing software and programs.

The computing device 803 can include a network interface 834 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 803 can communicate with other computing devices 802 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 834 can include a built-in network adapter, network interface card, PCMCIA network card, EXPRESSCARD network card, card bus network adapter, wireless network adapter, USB network adapter, modem or any other device suitable for interfacing the computing device 803 to any type of network capable of communication and performing the operations described herein.

A computing device 803 of the sort depicted in FIG. 8C can operate under the control of an operating system, which controls scheduling of tasks and access to system resources. The computing device 803 can be running any operating system configured for any type of computing device, including, for example, a desktop operating system, a mobile device operating system, a tablet operating system, or a smartphone operating system.

The computing device 803 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 803 has sufficient processor power and memory capacity to perform the operations described herein. In some embodiments, the computing device 803 can have different processors, operating systems, and input devices consistent with the device.

In embodiments, the status of one or more machines 106, 803 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 803 in response to the CPU 818 executing an arrangement of instructions contained in main memory 820. Such instructions can be read into main memory 820 from another computer-readable medium, such as the storage device 836. Execution of the arrangement of instructions contained in main memory 820 causes the computing device 803 to perform the illustrative processes described herein. One or more processors in a multi-processing arrangement may also be employed to execute the instructions contained in main memory 820. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

At least one aspect is directed to a method for transparent service response analysis. The method can be performed by one or more processors. For example, the method can be performed by one or more processors of a data processing system or a cloud computing system via a virtual machine. The method can include obtaining, by one or more processors, a network data packet from a network service provider, wherein the network data packet is a response to a request. The method can include determining, by the one or processors, the network data packet comprises a response code indicating a status of the request. Responsive to the determining the network data packet comprises the response code, the method can include extracting, by the one or more processors, the response code from the network data packet. The method can include modifying, by the one or more processors, an internet protocol (IP) header of the network data packet based on the response code. The method can include sending, to an external device and by the one or more processors, the network data packet with the modified IP header.

At least one aspect is directed to a system for transparent service response analysis. The system can include one or more processors coupled with memory. The one or more processors can be configured to obtain a network data packet from a network service provider, wherein the network data packet is a response to a request. The one or more processors can be configured to determine the network data packet comprises a response code indicating a status of the request. Responsive to the determining the network data packet comprises the response code, the one or more processors can be configured to extract the response code from the network data packet. The one or more processors can be configured to modify an internet protocol (IP) header of the network data packet based on the response code. The one or more processors can be configured to send, to an external device, the network data packet with the modified IP header.

At least one aspect is directed to a method for transparent service response analysis. The method can be performed by one or more processors. For example, the method can be performed by one or more processors of a data processing system or a cloud computing system via a virtual machine. The method can include obtaining, by one or more processors, a network data packet from a network service provider, wherein the network data packet is a response to a request. The method can include determining, by the one or processors, the network data packet comprises a response code indicating a status of the request. Responsive to the determining the network data packet comprises the response code, the method can include extracting, by the one or more processors, the response code from the network data packet. The method can include encapsulating, by the one or more processors, the network data packet based on the response code. The method can include sending, to an external device and by the one or more processors, the encapsulated network data packet.

At least one aspect is directed to a method for transparent service response analysis. The method can be performed by one or more processors. For example, the method can be performed by one or more processors of a data processing system or a cloud computing system via a virtual machine. The method can include obtaining, via a first network channel and by one or more processors, a network data packet from a network service provider, wherein the network data packet is a response to a request from a client. The method can include determining, by the one or processors, the network data packet comprises a response code indicating a status of the request. Responsive to the determining the network data packet comprises the response code, the method can include extracting, by the one or more processors, the response code from the network data packet. The method can include generating, by the one or more processors, an out-of-band response message comprising the response code. The method can include sending, to an external device via a second network channel and by the one or more processors, the out-of-band response message comprising the response code.

At least one aspect is directed to a system for transparent service response analysis. The system can include one or more processors coupled with memory. The one or more processors can be configured to obtain, via a first network channel, a network data packet from a network service provider, wherein the network data packet is a response to a request from a client. The one or more processors can be configured to determine the network data packet comprises a response code indicating a status of the request. Responsive to the determining the network data packet comprises the response code, the one or more processors can be configured to extract the response code from the network data packet. The one or more processors can be configured to generate an out-of-band response message comprising the response code. The one or more processors can be configured to send, to an external device via a second network channel, the out-of-band response message comprising the response code.

At least one aspect is directed to a non-transitory computer readable storage medium for transparent service response analysis. The medium can include instructions stored thereon. The instructions, when executed by a processor, cause the processor to obtain, via a first network channel, a network data packet from a network service provider, wherein the network data packet is a response to a request from a client. The instructions, when executed by a processor, cause the processor to determine the network data packet comprises a response code indicating a status of the request. Responsive to the determining the network data packet comprises the response code, the instructions, when executed by a processor, cause the processor to extract the response code from the network data packet. The instructions, when executed by a processor, cause the processor to generate an out-of-band response message comprising the response code. The instructions, when executed by a processor, cause the processor to send, to an external device via a second network channel, the out-of-band response message comprising the response code.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
   obtaining, via a first network channel and by one or more processors, a network data packet from a network service provider, wherein the network data packet is a response to a request from a client;
   determining, by the one or processors, the network data packet comprises a response code indicating a status of the request;
   responsive to the determining the network data packet comprises the response code, extracting, by the one or more processors, the response code from the network data packet;
   generating, by the one or more processors, an out-of-band response message comprising the response code by inserting the extracted response code from the network data packet into a field of the out-of-band response message; and
   sending, to an external device via a second network channel and by the one or more processors, the out-of-band response message comprising the response code, wherein the out-of-band response message is received at the external device without encryption.

2. The method of claim 1, further comprising:
   extracting, by the one or more processors, an internet protocol (IP) address of the client from the network data packet, wherein the out-of-band response message further comprises the IP address of the client.

3. The method of claim 1, wherein the first network channel is an in-band network channel and the second network channel is an out-of-band network channel.

4. The method of claim 3, wherein the out-of-band network channel is associated with at least one of a transmission control protocol (TCP) socket, a message bus, a web socket, or simple network management protocol (SNMP) traps.

5. The method of claim 1, wherein determining the network data packet comprises the response code comprises:
   querying, by the one or more processors, a database comprising a plurality of response identifiers, each of the plurality of response identifiers indicating a respective response type and a location of the response code within the network data packet based on the respective response type.

6. The method of claim 1, further comprising:
   obtaining, by one or more processors, a second network data packet from the network service provider, wherein the second network data packet is a second response to a second request; and
   responsive to determining the second network data packet does not comprise a response code, forwarding, by the one or more processors, the second network data packet to the external device without modifying a second IP header of the second network data packet.

7. The method of claim 1, wherein the response code comprises an error response code.

8. The method of claim 7, wherein the error response code is associated with at least one of a domain name system (DNS) error response code, a hypertext transfer protocol (HTTP) error response code, a file transfer protocol (FTP) error response code, a simple mail transfer protocol (SMTP) error response code, an internet message access protocol (IMAP) error response code, or an internet control message protocol (ICMP) error response code.

9. A system comprising:
   one or more processors coupled with memory and configured to:
   obtain, via a first network channel, a network data packet from a network service provider, wherein the network data packet is a response to a request from a client;
   determine the network data packet comprises a response code indicating a status of the request;
   responsive to the determining the network data packet comprises the response code, extract the response code from the network data packet;
   generate an out-of-band response message comprising the response code by inserting the extracted response code from the network data packet into a field of the out-of-band response message; and
   send, to an external device via a second network channel, the out-of-band response message comprising the response code, wherein the out-of-band response message is received at the external device without encryption.

10. The system of claim 9, wherein execution of the instructions causes the one or more process to:

extract an internet protocol (IP) address of the client from the network data packet, wherein the out-of-band response message further comprises the IP address of the client.

11. The system of claim 9, wherein the first network channel is an in-band network channel, and the second network channel is an out-of-band network channel.

12. The system of claim 11, wherein the out-of-band network channel is associated with at least one of a transmission control protocol (TCP) socket, a message bus, a web socket, or simple network management protocol (SNMP) traps.

13. The system of claim 9, wherein execution of the instructions causes the one or more process to:
   query a database comprising a plurality of response identifiers, each of the plurality of response identifiers indicating a respective response type and a location of the response code within the network data packet based on the respective response type.

14. The system of claim 9, wherein execution of the instructions causes the one or more process to:
   obtain a second network data packet from the network service provider, wherein the second network data packet is a second response to a second request; and
   responsive to determining the second network data packet does not comprise a response code, forwarding, by the one or more processors, the second network data packet to the external device without modifying a second IP header of the second network data packet.

15. The system of claim 9, wherein the response code comprises an error response code.

16. The system of claim 15, wherein the error response code is associated with at least one of a domain name system (DNS) error response code, a hypertext transfer protocol (HTTP) error response code, a file transfer protocol (FTP) error response code, a simple mail transfer protocol (SMTP) error response code, an internet message access protocol (IMAP) error response code, or an internet control message protocol (ICMP) error response code.

17. A non-transitory computer readable storage medium comprising instructions stored thereon that, when executed by a processor, cause the processor to:
   obtain, via a first network channel, a network data packet from a network service provider, wherein the network data packet is a response to a request from a client;
   determine the network data packet comprises a response code indicating a status of the request;
   responsive to the determining the network data packet comprises the response code, extract the response code from the network data packet;
   generate an out-of-band response message comprising the response code by inserting the extracted response code from the network data packet into a field of the out-of-band response message; and
   send, to an external device via a second network channel, the out-of-band response message comprising the response code, wherein the out-of-band response message is received at the external device without encryption.

18. The medium of claim 17, wherein the instructions stored thereon further cause the processor to:
   extract an internet protocol (IP) address of the client from the network data packet, wherein the out-of-band response message further comprises the IP address of the client.

19. The medium of claim 17, wherein the first network channel is an in-band network channel, and the second network channel is an out-of-band network channel.

20. The medium of claim 17, wherein the out-of-band network channel is associated with at least one of a transmission control protocol (TCP) socket, a message bus, a web socket, or simple network management protocol (SNMP) traps.

* * * * *